US005455673A

United States Patent [19]
Alsmeyer et al.

[11] Patent Number: 5,455,673
[45] Date of Patent: Oct. 3, 1995

[54] APPARATUS AND METHOD FOR MEASURING AND APPLYING A CONVOLUTION FUNCTION TO PRODUCE A STANDARD RAMAN SPECTRUM

[75] Inventors: Daniel C. Alsmeyer; Brinda A. Gala; Vincent A. Nicely, all of Kingsport, Tenn.

[73] Assignee: Eastman Chemical Company, Kingsport, Tenn.

[21] Appl. No.: 250,396

[22] Filed: May 27, 1994

[51] Int. Cl.$^6$ .............................. G01J 3/44; G01N 21/65
[52] U.S. Cl. .............................................. 356/301
[58] Field of Search .................................. 356/301, 318, 356/346

[56] References Cited

U.S. PATENT DOCUMENTS

| | | | |
|---|---|---|---|
| 4,573,761 | 3/1986 | McLachlan et al. | 356/301 |
| 4,620,284 | 10/1986 | Schnell et al. | 356/301 |
| 4,693,377 | 9/1987 | Gerrard et al. | 356/318 |
| 4,802,762 | 2/1989 | Hill, Jr. | 356/318 |
| 4,927,269 | 5/1990 | Keens et al. | 356/346 |
| 5,048,959 | 9/1991 | Morris et al. | 356/301 |
| 5,112,127 | 3/1992 | Carrabba et al. | 356/301 |
| 5,139,334 | 8/1992 | Clarke | 356/301 |
| 5,245,406 | 9/1993 | Masutani | 356/346 |
| 5,309,217 | 5/1994 | Simon et al. | 356/346 |
| 5,357,337 | 10/1994 | Michon et al. | 356/346 |

OTHER PUBLICATIONS

Press et al., "Numerical Recipes: The Art of Scientific Computing", 1986, Cambridge University Press, pp. 381–383 and 407–412.
Newman et al., "Fiber–Optics Sampling Combined With An Imaging Spectrograph For Routine Raman Spectrocopy," Appl. Spec., 1992, vol. 46, pp. 262–265.
Angel et al., "Simultaneous Multi–Point Fiber–Optic Raman Sampling For Chemical Process Control Using Diode Lasers and a CCD Detector," SPIE, 1991, vol. 1587, pp. 219–231.
Treads, et al, "Hadamard Transform Raman Imaging," Appl. Spec., 1988, vol. 42, pp. 897–901.
Treads, et al., "Multi channel Hadamard Transform Raman Microscopy," Appl. Spec., 1990, vol. 44, pp. 1–4.
Treads, et al., "A Hadamard Transform Raman Microprobe," Appl. Spec. vol. 43, 1989, pp. 190–193.
Wang and McCreery, Anal. Chem., 1990, vol. 62, pp. 2647–2651.
Chase, J. Am. Chem. Soc., 1986, vol. 108, pp. 7485–7488.
Carrabba et al., Appl. Spec., 1990, vol. 44, pp. 1558–1561.
Newman et al., Appl. Spec., 1992, vol. 46, pp. 262–265.
Seasholtz et al., Appl. Spec., 1989, vol. 43, pp. 1067–1072.
Smith and Walder, "Quantitative Analysis Using FT–Raman Spectroscopy," Nicolet Instrument Corporation technical publication AN–9145, 1991.
Carrabba et al., "Compact Raman Instrumentation for Process and Environmental Monitoring," SPIE, 1991, vol. 1434, pp. 127–134.
Press et al., Numerical Recipes: The Art of Scientific Computing, 1986, Cambridge University Press, pp. 381–383 and 407–412.
Vess and Angel, "Near–Visible Raman Instrumentation for Remote Multi–Point Process Monitoring Using Optical Fibers and Optical Multiplexing," SPIE, 1991, vol. 1637, pp. 118–125.
Decker, Applied Optics, 1971, vol. 10, pp. 510–514.
Skoog and West, Principles of Instrumental Analysis, 2nd ed., 1980, Saunders College, Philadelphia, p. 254.

Primary Examiner—F. L. Evans
Attorney, Agent, or Firm—John F. Stevens; Harry J. Gwinnell

[57] ABSTRACT

A Raman spectrometry apparatus that is capable of measuring and compensating for variabilities in the apparatus comprises a source of substantially monochromatic radiation, means for simultaneously interfacing the radiation with a sample and a reference material, means for simultaneously acquiring at more than one wavelength a convolved Raman spectrum of the sample and a convolved spectrum of the reference material, and means for determining the convolution function of the convolved spectra and applying the convolution function to adjust the convolved Raman spectrum of the sample to produce thereby the standard Raman spectrum of the sample. A method for obtaining the standard Raman spectrum of a sample comprises:

(a) simultaneously irradiating the sample and a reference material with a substantially monochromatic radiation source;

(b) simultaneously acquiring at more than one wavelength a convolved Raman spectrum of the sample and a convolved spectrum of the reference material;

(c) choosing the standard spectrum of the reference material;

(d) from the convolved Raman spectrum of the sample and the convolved spectrum of the reference material and the standard spectrum of the reference material, determining the convolution function of the convolved spectra; and (e) applying the convolution function to adjust the convolved Raman spectrum of the sample to produce thereby the standard Raman spectrum of the sample.

40 Claims, 10 Drawing Sheets

APPARATUS AND METHOD FOR MEASURING AND APPLYING A CONVOLUTION FUNCTION TO PRODUCE A STANDARD RAMAN SPECTRUM

FIELD OF THE INVENTION

This invention relates generally to Raman spectrometry, and more particularly to a standardized Raman spectrometry apparatus capable of measuring and compensating for variabilities in the system.

BACKGROUND OF THE INVENTION

The use of spectrometry in analytical laboratories for measuring physical and analytical properties of materials is a well established art. Raman spectrometry is one such technique that can provide qualitative and quantitative information about composition and/or molecular structure of chemical substances. When incident radiation interacts with matter it may undergo a process called scattering. Scattered radiation may be elastic, in which the incident wavelength is unchanged in the scattered radiation, or inelastic, in which the scattered radiation has different wavelengths than the incident radiation. In one form of inelastic radiation scatter, referred to as Raman scattering, incident photons are scattered with either a gain or loss of energy. The energy difference between the scattered and incident radiation is commonly referred to as the Raman shift. The resultant Raman shift spectrum provides the energy of various molecular vibrational motions and conveys chemical and molecular information regarding the matter studied.

The Raman scattering effect is extremely weak; typically a few Raman scattered photons exist among millions of elastically scattered photons. This small Raman signal amongst the large elastically scattered signal places severe demands on the instrumental design of any spectrometer used to collect useful Raman spectra.

Numerous radiation sources are capable of generating Raman scatter from a material. For analytical measurement, these sources need to emit monochromatic radiation of high intensity. In this regard, lasers are well suited radiation sources. U.S. Pat. No. 3,556,659, the disclosures of which are incorporated herein by reference, describes a Raman spectrometer in which a sample contained in a tube is irradiated by radiation from a laser along the axis of the tube.

There are various classes of laser radiation sources, including: gas lasers, such as helium-neon, nitrogen, argon ion and krypton ion; solid state lasers, such as ruby lasers and Nd:YAG (neodymium:yttrium-aluminum-garnet) lasers; dye lasers; chemical lasers; and solid state lasers, such as single mode and multi-mode diode lasers.

Of these, gas lasers are generally accepted as especially suitable for dispersive Raman spectrometry because of their high degree of wavelength stability. Unfortunately, they are either expensive and require extensive maintenance, or they have low output power. The use of semiconductor diode lasers in Raman spectrometry, which can provide large power output in a compact, rugged device but which may exhibit inherent instabilities in their output properties, are described in Wang and McCreery, *Anal. Chem.*, 1990, Vol. 62, pp. 2647–2651, the disclosures of which are incorporated herein by reference.

Because the Raman scattering process relates to a shift from an incident wavelength, different lasers provide spectra in different wavelength regions. However, the Raman shift spectra in those regions are similar, and essentially the same structural information can be obtained through the use of different incident laser wavelengths.

Fluorescence is a process by which absorbed radiation induces broad emission, characteristic of the molecular structure. The induced fluorescence signal, if observed, is typically many orders of magnitude larger than the Raman signal and in some cases completely masks the Raman shift spectrum. Thus, it is desirable to select an incident wavelength that minimizes fluorescence emission processes.

A well known method to reduce fluorescence background problems is to use lasers which generate red or near infrared radiation, with wavelengths from about 660 nanometers to 1100 nanometers, as described in D. B. Chase, *J. Am. Chem. Soc.*, 1986, Vol. 108, pp. 7485–7488, the disclosures of which are incorporated herein by reference. Such a method is useful because the fluorescence emission profile is independent of incident wavelength and the Raman process is a shift from the incident wavelength. Typical radiation sources operating in this region include krypton ion gas lasers, single mode diode lasers, multi-mode diode lasers, and Nd:YAG lasers.

The large ratio of elastically to Raman scattered photons requires an efficient method of photon separation. Traditionally, this has been accomplished with double or triple spectrograph systems, constructed with two or three dispersive elements, respectively. Other radiation filtering devices can sufficiently reject the elastically scattered photons to permit the use of smaller, more efficient single dispersive element spectrograph devices; for example, holographic Bragg diffraction filters are described in Carrabba et al., *Appl. Spec.*, 1990, Vol. 44, pp. 1558–1561, the disclosures of which are incorporated herein by reference.

The detector element is critical to the performance of the Raman instrument and must be capable of discerning extremely low levels of radiation. Traditional scanning monochromator systems have used photomultiplier tubes that are capable of observing low photon signals. More recent instruments employ array detectors such as photodiode arrays (PDA) or charge coupled devices (CCD). Array detectors consist of multiple optical elements that can simultaneously observe a region of the spectrum up to the entire Raman spectrum. CCD detectors are multi-dimensional and able to observe multiple Raman spectra at more than one wavelength simultaneously.

The previously mentioned paper by Wang and McCreery describes the use of a charge coupled device together with a near-infrared diode laser in a Raman spectrometer of high sensitivity. Also, Newman et al., *Appl. Spec.*, 1992, Vol. 46, pp. 262–265, the disclosures of which are incorporated herein by reference, describes the use of a CCD and diode laser with a flat field imaging spectrograph provided with a fiber optic interface with the sample.

Raman spectrometry instrumentation that combines a single dispersive grating spectrograph with a CCD detector, single-mode diode laser, fiber optic cables, a fiber optic probe, and a suitable computer may be able to accomplish in seconds what used to take minutes to hours with traditional instrumentation. However, mechanical stability of the spectrograph and detector system and other optical interfaces as well as the diode laser instabilities cause severe limitations to the ultimate quantitative capability.

Fourier Transform (FT) Raman spectrometry has been proposed for quantitative chemical analysis. However, due to instrumental variations, the analysis is generally limited to, at best, about one percent reproducibility, as described in Seasholtz et al., *Appl. Spec.*, 1989, Vol. 43, pp. 1067–1072, and in Smith and Walder, "Quantitative Analysis Using FT-Raman Spectroscopy," Nicolet Instrument Corporation technical publication AN-9145, 1991. This level of uncertainty is inadequate for many quantitative applications.

Problems to be Solved by the Invention

The use of Raman instruments to obtain spectra for quantitative chemical determinations is limited by the considerable extent of system variability. This variability in Raman spectrometry apparatus has many sources, including the following:

(a) variation in the intensity and/or wavelength of the source radiation, which can be in the energy profile (wavelength) of the incident beam or the wavelength position (energy of incident radiation) of the profile;

(b) variation in optical alignment, for example, in the input optical components;

(c) variation in the characteristics of the spectrograph;

(d) variation in the position of the detector; and (e) random detector noise variation arising from photon counting statistics (referred to as "shot noise"), random movement of molecules and electrons in the detector component (referred to as "dark noise"), and instabilities arising during conversion of the electronic signal from the detector to an analog signal (referred to as "read noise").

Different analyses have unique spectral quality requirements. For example, an analysis for the ratio of two materials for which the spectra of the components are different and non-overlapping would be relatively tolerant of both intensity and wavelength instability. U.S. Pat. No. 5,139,334, the disclosures of which are incorporated herein by reference, describes a method of analyzing hydrocarbon mixtures in which a Raman spectrum of a sample is separated into two non-overlapping ranges, the intensity of scattered radiation in each range is integrated, and the integrated intensity values are compared to provide a measurement of the sample properties. However, in a complex analysis of many components that may have similar spectra, there may not be two non-overlapping ranges with the necessary properties for adequate analysis. Compensation for the variabilities in the radiation source and other components of the Raman spectrometry apparatus, as is provided by the present invention, would enable the use of statistically based procedures such as multiple linear regression or partial least squares to achieve an accurate analysis of a complex mixture.

A simple test of the quantitative reproducibility of a spectrometer apparatus is to collect two spectra of the same material of interest at two different times. One spectrum is subtracted from the other to produce a difference spectrum, in which can be seen a residue that is the consequence of the non-reproducible features of the two spectra. In the optimum situation, the residue, which derives from such sources as read noise from the detector and shot noise from the fluctuations in the photon arrival rate, would be of random intensity difference with wavelength. Any residue that looks like the original spectrum (intensity instability), the first derivative of the original spectrum (wavelength position shifts between the two spectra), the second derivative of the original spectrum (relative broadening between the spectra), or combinations of the above, indicates instabilities in the components of the apparatus.

SUMMARY OF THE INVENTION

A Raman spectrometry apparatus that is capable of measuring and compensating for variabilities in the apparatus comprises a source of substantially monochromatic radiation, means for simultaneously interfacing the radiation with a sample and reference material, means for simultaneously acquiring at more than one wavelength the convolved Raman spectrum of the sample and a convolved spectrum of the reference material, and means for determining the convolution function of the convolved spectra and applying the convolution function to adjust the convolved Raman spectrum of the sample to produce thereby the standard Raman spectrum of the sample.

A method for obtaining the standard Raman spectrum of a sample comprises:

(a) simultaneously irradiating the sample and a reference material with a substantially monochromatic radiation source;

(b) simultaneously acquiring at more than one wavelength a convolved Raman spectrum of the sample and a convolved spectrum of the reference material;

(c) choosing the standard spectrum of the reference material;

(d) from the convolved Raman spectrum of the sample and the convolved spectrum of the reference material and the standard spectrum of the reference material, determining the convolution function of the convolved spectra; and (e) applying the convolution function to adjust the convolved Raman spectrum of the sample to produce thereby the standard Raman spectrum of the sample.

Advantageous Effect of the Invention

The Raman spectrometry apparatus and spectrum standardization method of this invention allows one to measure and compensate for variabilities in the spectra of the sample and the reference material owing to instabilities in various components in the apparatus so that, after standardization, the difference spectrum shows only fluctuations characteristic of random detector noise. The standard Raman spectrum obtained in accordance with the present invention enables precise quantitative measurements of a sample, which find use in monitoring the course of a variety of chemical processes such as, for example, distillation or polymerization.

DETAILED DESCRIPTION OF THE INVENTION

Figure 1:
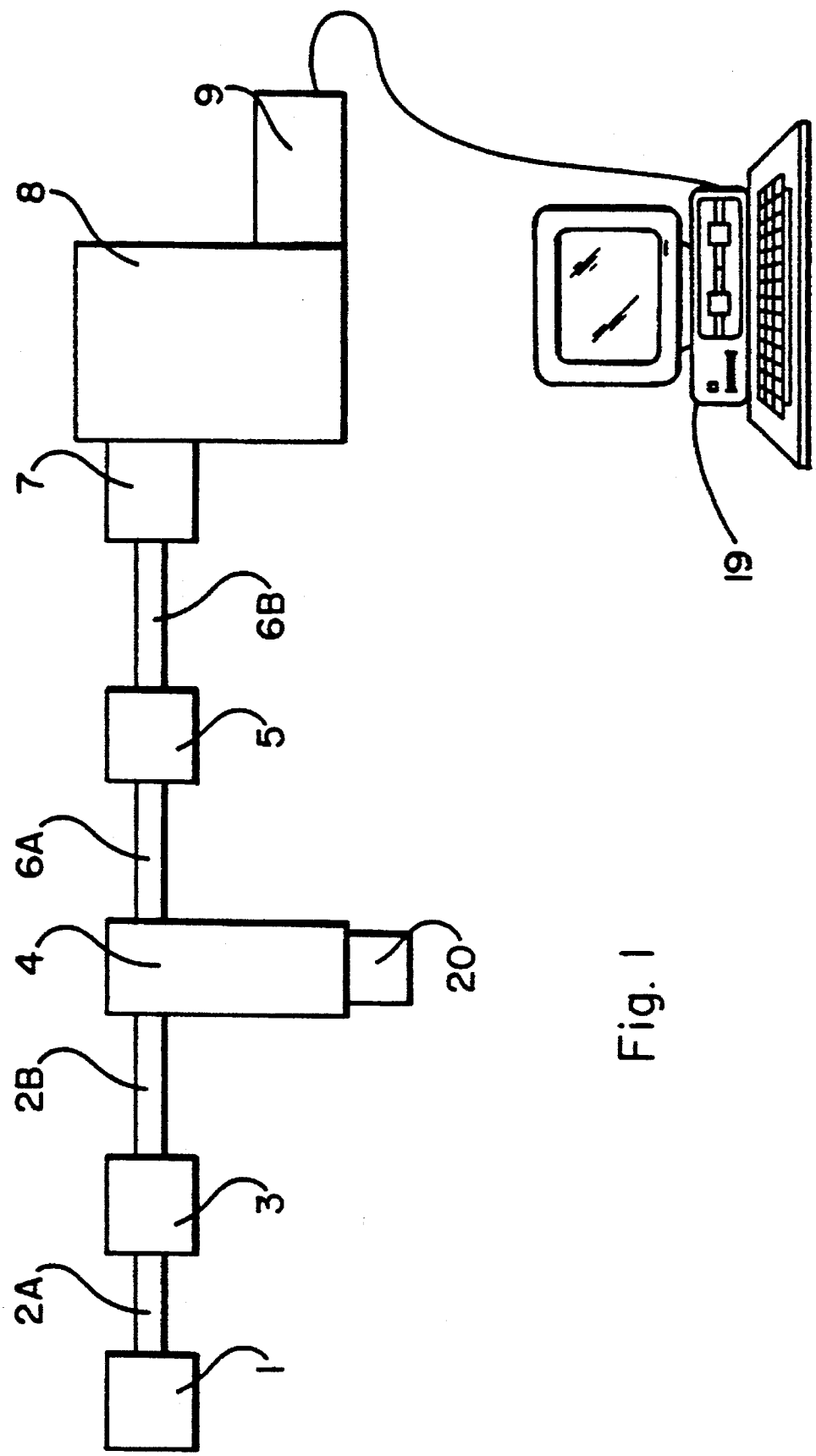
FIG. 1 is a schematic diagram of a single probe Raman spectrometer.

The Raman spectrometry apparatus of the present invention is capable of measuring and compensating for both long-term and short-term variations and instabilities in its component parts. It uses a referencing technique that simultaneously acquires the convolved spectra of samples with unknown characteristics and a reference material, where all spectra have been subjected to the same instabilities. This Raman spectrometry apparatus is particularly useful in applications where precise quantitative determinations of structural or compositional properties of matter are required, and where it is convenient to use unstable or variable spectrometer components for reasons of ruggedness, simplicity, cost, speed, and the like.

U.S. Pat. No. 4,620,284, the disclosures of which are incorporated herein by reference, describes a method and apparatus for comparing the Raman spectrum of an unknown sample with reference spectra of known materials, the reference spectra being stored in digital form in a computer, and the comparison of the spectra being accomplished by the computer. There is no provision, however, for the detection of and compensation for long-term and short-term variations and instabilities in the spectrophotometric apparatus.

The present invention describes a Raman spectrometry apparatus and a method in which variations from source, detector, and/or mechanical positioning instabilities are measured for an acquired Raman spectrum so that the necessary compensation can be provided. A preferred embodiment of this apparatus utilizes an instrument constructed with a radiation source, optics, a dispersive element, and a multichannel array detector, together with a mathematical procedure for obtaining the convolution function and providing the standard Raman spectrum of a sample.

Minimizing instabilities in diode lasers may be achieved through proper control of temperature and unwanted emissions, as described in Carrabba et al., "Compact Raman Instrumentation for Process and Environmental Monitoring," SPIE 1991 Vol 1434, *Environmental Sensing and Combustion Diagnostics*, pp. 127–134, the disclosures of which are incorporated herein by reference. For the control of undesirable laser emissions, Carrabba et al. describes holographic optical edge filters which have very high optical density at the laser wavelength.

Without controls such as those described, diode lasers are unstable and thus regarded as of little use for Raman spectroscopic investigations. Further, the wavelength of any diode laser device will gradually shift as the device ages. A diode laser device, though stable for short times, is characterized by long-term instabilities which produce a slow drift, resulting in reduced instrument reliability. To date there have been no published solutions to these long-term instability difficulties with diode laser devices when applied to Raman spectrometry.

Typical single mode diode lasers are relatively inexpensive but perform with substantially less output power compared to gas lasers. Multi-mode diode lasers, which have inherent wavelength instabilities, generate substantially more laser power output than single mode diode laser devices, but they exhibit a constantly changing wavelength intensity profile. Thus, multi-mode diode lasers, while attractive because of their large power output, have not heretofore been considered useful in providing reproducible Raman spectra.

Normally, Raman spectra are obtained by scattering laser radiation with a wavelength spread and variation much smaller than the resolution of the instrument. However, by reducing resolution, additional signal throughput can be obtained and broader bands may be used. For example, a multi-mode diode laser has less spectral purity and stability than traditional sources but could provide a greater signal at a reduced cost. Though it may appear that less resolution provides less information, broad signals often contain information similar to narrow signals, which can be extracted by proper mathematical routines.

Another source of variation in a spectrometer used in an on-line process control environment is related to maintenance or repair operations. For example, a major component in the spectrometer might need to be replaced because of malfunction. If a detector is removed and remounted, position inaccuracies of as little as a few micrometers will lead to spectral errors sufficient to destroy quantitative calibration. If a diode laser were to be replaced, the new laser could have characteristics significantly different from the replaced item. In the chemical process industry, these and other changes in spectrometric instrumentation are likely to occur. To provide a useful process analysis tool, the spectrometer apparatus must be robust enough to permit these changes without major disruption of its operation.

In a Raman spectral determination, the observed signal will always be a convolution of the desired signal and an instrumental response. In general, instrumental responses broaden, shift, or otherwise distort the desired signal.

The convolution process, though non-linear in an observed spectrum, can be represented as a multiplication in the time domain. FT techniques are commonly used to accomplish the conversion to and from the time domain. In the time domain, the deconvolution process is a straightforward division, using complex numbers (which consist of both a real and imaginary component), of the observed signal by the instrumental response function.

Under ideal conditions, the instrument response may be determined either experimentally or by a theoretical calculation. However, when the apparatus response changes with time, as is the case with unstable lasers or other components, traditional methods of using FT deconvolution to compensate for instrumental effects are inadequate.

A Raman spectrometer useful for the practice of the present invention may be constructed such that the radiation from a laser is optically filtered and transmitted to the sampled matter; the Raman scattered radiation is then collected, optically filtered, and transmitted to the dispersive element, where individual wavelengths are separated and monitored with a multichannel array detector.

The detector continuously monitors the spectra of both the sampled matter and that of a suitable reference material. The convolved spectrum of the reference material, also referred to herein as the convolved reference spectrum, consists of a spectral fragment with known spectral characteristics convolved with all random instabilities in the radiation source and/or mechanical instabilities in the instrument. The convolved reference spectrum is convolved by the apparatus in the same way as the convolved spectrum of the sample, also referred to herein as the convolved sample spectrum.

There are two general situations encountered in the practice of the invention: one in which the sample provides a suitable spectral fragment to serve as the convolved reference spectrum, and the other in which no such spectral fragment exists. In general, it is rare that a sample will exhibit a suitable convolved reference spectral fragment, and thus the latter is a more general and more preferred embodiment of the method of the invention.

The reference material may be mixed with a sample either homogeneously, for example, as a solvent for the sample, or heterogeneously, for example, as small particles. The reference material may be included in a window or cell that is irradiated by the same beam that irradiates the sample. Alternatively, the reference material sample may be irradiated by separate beams with the same characteristics.

FIG. 1 schematically illustrates a Raman spectrometry apparatus that can be used when a suitable reference spectral fragment exists in a sample 20. Such an instrument is composed of a radiation source 1, an excitation optical waveguide 2A and 2B, excitation filtering means 3, an optical probe 4, incident wavelength rejection means 5, a collection optical waveguide 6A and 6B, a spectrograph interface 7, a spectrograph 8, a detector 9, and a computer 19 provided with appropriate mathematical routines.

Figure 2:
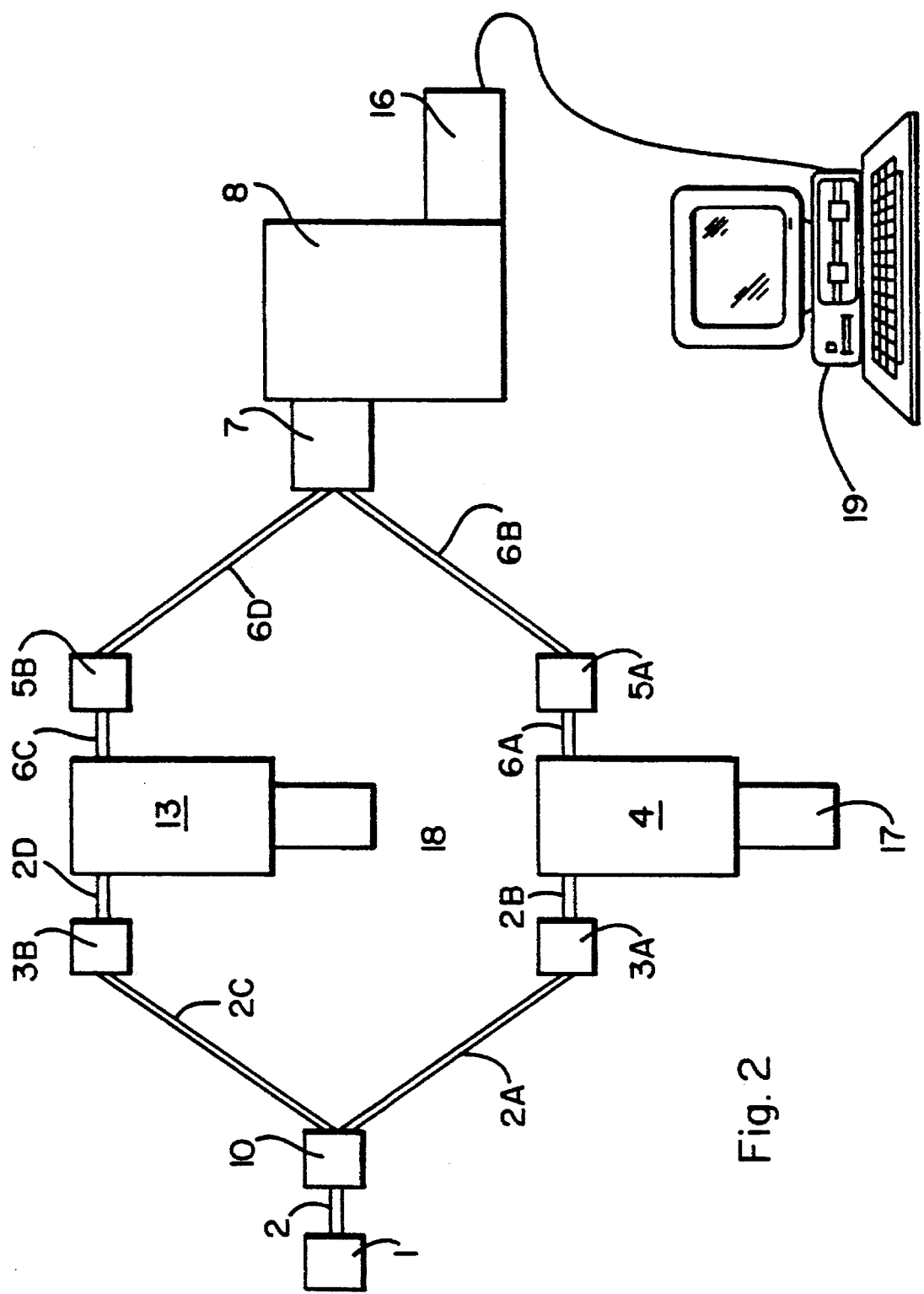
FIG. 2 is a schematic diagram of a double probe Raman spectrometer.

FIG. 2 illustrates a more general Raman spectrometry apparatus that can be used where no reference spectral fragment exists in the spectrum of the sample. This instrument differs from that described in FIG. 1 by the addition of a beam splitter 10, additional excitation optical waveguides 2, 2C and 2D, additional excitation filtering means 3A and 3B, an additional optical probe 13, additional incident wavelength rejection means 5A and 5B, additional collection optical waveguides 6C and 6D, and a requirement that the array detector 16 be multidimensional.

Excitation optical waveguides 2, 2A, 2B, 2C, and 2D may be various lenses, mirrors, fiber optic cables, or combinations thereof that are capable of transmitting radiation over the desired distance. Commonly, the waveguides are low hydroxyl content quartz fiber optic cables.

Excitation filtering means 3, 3A, and 3B are required to remove stray radiation from the source beam prior to laser radiation interaction with the sampled matter. Such means may be placed near the unstable laser, near the optical probe, or at any location between. Typical filtering means include grating dispersion, dielectric interference, or holographic bandpass filters to isolate the incident radiation from undesired stray radiation.

Incident wavelength rejection means 5, 5A, and 5B are used to remove elastically scattered radiation from Raman scattered radiation. Such means may be placed near the optical probe, near the entrance optics, at any location between the optical probe and the entrance optics, or as part of the spectrograph system. Typical means include combinations of dispersive gratings, holographic notch rejection filters, indium-doped cadmium telluride crystals, dielectric notch rejection filters, and dielectric long pass edge filters. In general, such rejection means must be capable of rejecting greater than 100,000 elastically scattered photons for every Raman photon.

Optical probes 4 and 13 are used to interface the incident radiation with the sample and reference material, respectively. Such devices generally comprise a combination of lenses, mirrors, windows, and/or fiber optic cables through which the incident radiation may interact with the sampled matter and/or reference material and through which the Raman scattered radiation is collected. U.S. Pat. No. 4,573,761, the disclosures of which are incorporated herein by reference, describes a fiber optic probe that comprises at least one optical fiber for transmitting radiation into a sample and at least two optical fibers for collecting radiation from the sample. U.S. Pat. No. 5,112,127, the disclosures of which are incorporated herein by reference, discloses a fiber optic probe with optics that filter scattering and fluorescence by the fiber, focus the filtered light on an external sample, collect the scattered radiation from the sample, and refocus the scattered radiation to the exit fiber.

Beam splitter 10 performs the function of splitting incident laser radiation into two or more distinct paths. Such devices are typically constructed either by fusing together two or more optical fibers or using special beam splitting optics such as prisms or half-silvered mirrors. The specific construction of beam splitting devices is not crucial to the invention so long as each path contains a similar representation of the incident radiation. Such devices, several of which are commercially available, include prism- and plate-type beam splitters, from Melles Griot, Irvine, Calif., fiber-coupled prisms, from Oz Optics, Carp, Ontario, Canada, and fused fiber optic beam splitters, from Oz Optics and C-Technologies, Trenton, N.J.

The spectrograph interface 7 usually contains spectrograph entrance optics and an adjustable slit for the monochromator. Entrance optics are used to match the aperture of the collection waveguide to the aperture of the spectrograph. The adjustable slit influences the resolution of the resultant Raman spectrum.

The spectrograph 8 functions to disperse the individual wavelength of the Raman radiation. Such devices are typically composed of dispersive grating elements, mirrors, and/or lenses.. Commercially available spectrographs such as single grating dispersion instruments from Instruments S. A., Inc., Edision, N.J., Chromex, Albuquerque, N.M., or Acton Inc., Acton, Mass., holographic dispersion instruments from Kaiser Optics, Ann Arbor, Mich., or FT-interferometers from Nicolet Instrument Corp., Madison, Wis., are suitable for the practice of the invention.

The detector element 16 for a dispersion instrument may be a multi-channel array detector, such as a PDA or CCD, which enables all wavelengths of the spectrum to be simultaneously monitored. When distinct reference and sample channels are used, it is necessary that the detector be multidimensional. Useful multi-channel array detectors include photo-diode arrays, intensified photo-diode arrays, charge-coupled devices (CCD), photographic films, Vidicon tubes, and charge injection devices. It is important that the detector have very low noise characteristics, such that measurements are limited by photon shot noise rather than detector read or dark current noise. A suitable and preferred detector that meets these requirements is a charge-coupled device (CCD).

Suitable mathematical routines are also useful for the practice of this invention. The collected spectra are mathematically treated with a standardization process that compensates for all but random detector noise variability. In this process, the following spectral information is important: the convolved sample spectrum, the convolved reference spectrum, the standard reference spectrum, the standard sample spectrum, and the convolution function.

The convolved sample spectrum, $S'(x)$, is a digital representation of the Raman spectrum of the unknown sample material, as obtained from the spectrograph detector. This spectrum is influenced by variations from both instrumental (laser and/or mechanical) instabilities and structural changes in the sample.

As described above, the convolved reference spectrum, $R'(x)$, contains a spectral fragment with known shape characteristics convolved with all instrument instabilities. This spectral fragment must be convolved with the same convolution function as the convolved sample spectrum.

The convolution function, $c(x)$, which enables one to compensate for the variations resulting from radiation source variability and/or instrument mechanical instabilities, contains the information necessary to transform a standard spectrum into a convolved spectrum, and vice versa.

The standard reference spectrum, $R(x)$, is a selected spectrum that should be a true representation of the underlying shape of the convolved reference spectrum. The standard reference spectrum may be a theoretical mathematical representation of the invariant portion of the convolved reference spectrum; it may also be a previously acquired convolved spectrum of the reference material that has been adjusted or smoothed. Preferably, it is a spectrum obtained by averaging a multiplicity of previously acquired convolved spectra of the reference material. It is not necessary, however, that a spectrum used to provide the standard reference spectrum be obtained from the same instrument as that used to acquire the convolved spectra of the sample and the reference material.

The standard sample spectrum, $S(x)$, which is produced by the apparatus and method of the present invention, is the resultant sample spectrum after all random instrument variations except random detector noise have been removed. This spectrum will vary according to chemical composition and thus enables a precise quantitative analysis of the sample.

Figure 3:
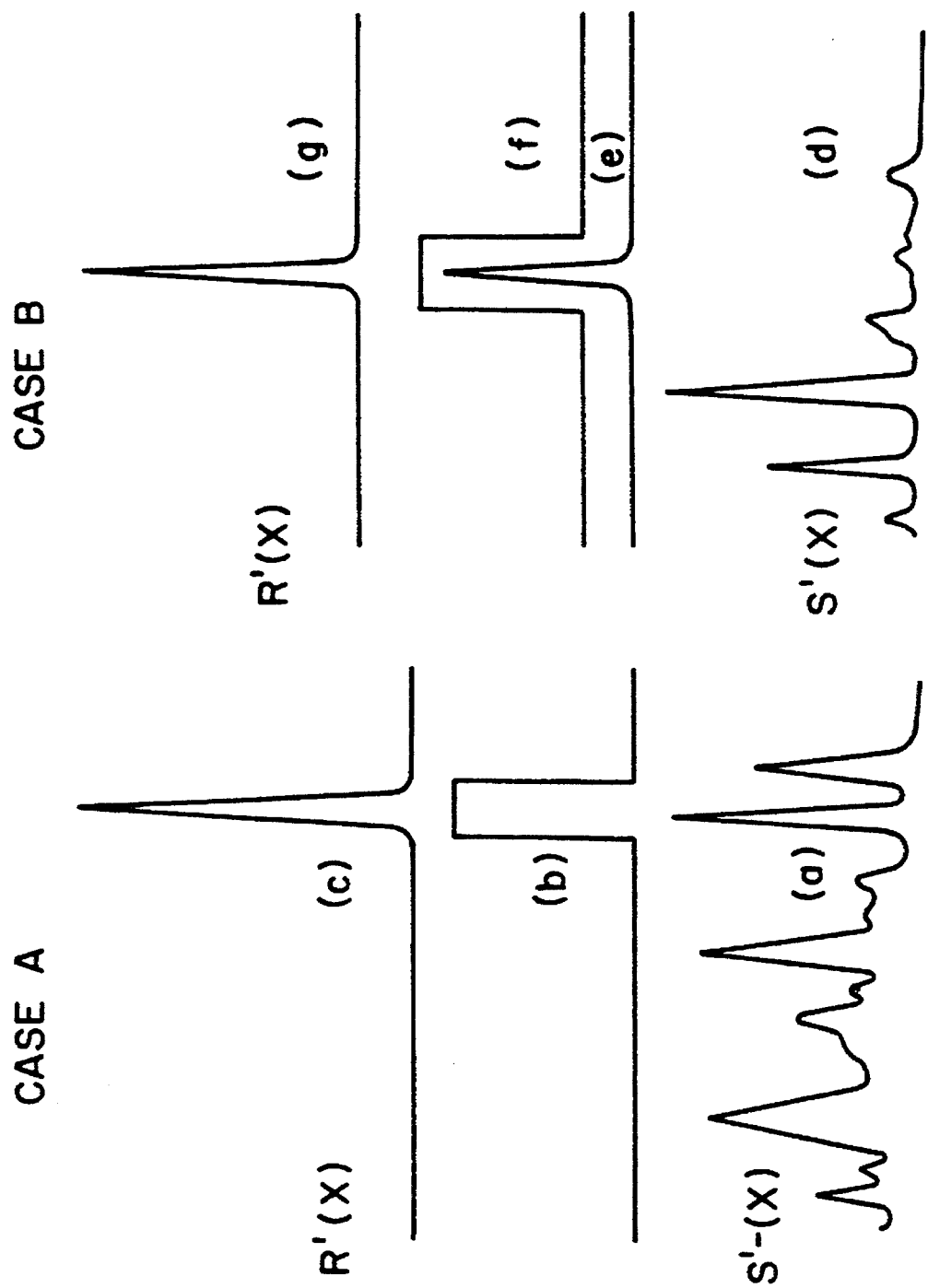
FIG. 3 is an illustration of a procedure for obtaining the convolved spectra of a sample and a reference.

As previously discussed, there are two general situations for the practice of the invention. FIG. 3 illustrates a procedure for obtaining the unknown convolved sample spectrum and the convolved reference spectrum for either situation. In case A, where a suitable reference spectral fragment in the Raman sample spectrum exists, collection of the sample spectrum, FIG. 3(a), is sufficient for the standardization process. A suitable spectral fragment is one which remains unchanged as the sample undergoes composition or temperature changes. Mathematical routines may be used to isolate this reference fragment from extraneous portions of the spectrum, for example, multiplication of the function in trace (a) by the function in trace (b) to get the function in trace (c). The resultant waveform becomes the convolved reference spectrum, FIG. 3(c).

In a variation of case A, elastically scattered radiation may be employed as the convolved spectrum of the reference material.

In case B, where no suitable reference spectral band exists in the sample spectrum, the laser beam is split into two beams or channels, one of which enters into the reference material and the other into the sample. A suitable reference material is one that exhibits a consistent, reliable spectral fragment. Diamond, whose Raman spectrum has a single strong vibration at about $1332 cm^{-1}$, which lies in the middle of the $500-2000 cm^{-1}$ "fingerprint" region, is an especially suitable and preferred reference material. In this way, a convolved sample spectrum, FIG. 3(d), and a convolved reference spectrum, FIG. 3(e), are simultaneously measured with a two-dimensional array detector. Extraneous bands may be removed from the reference spectrum by a mathematical routine, for example, multiplication of function (e) by function (f) to get function (g), which provides the convolved reference spectrum, FIG. 3(g).

Figure 4:
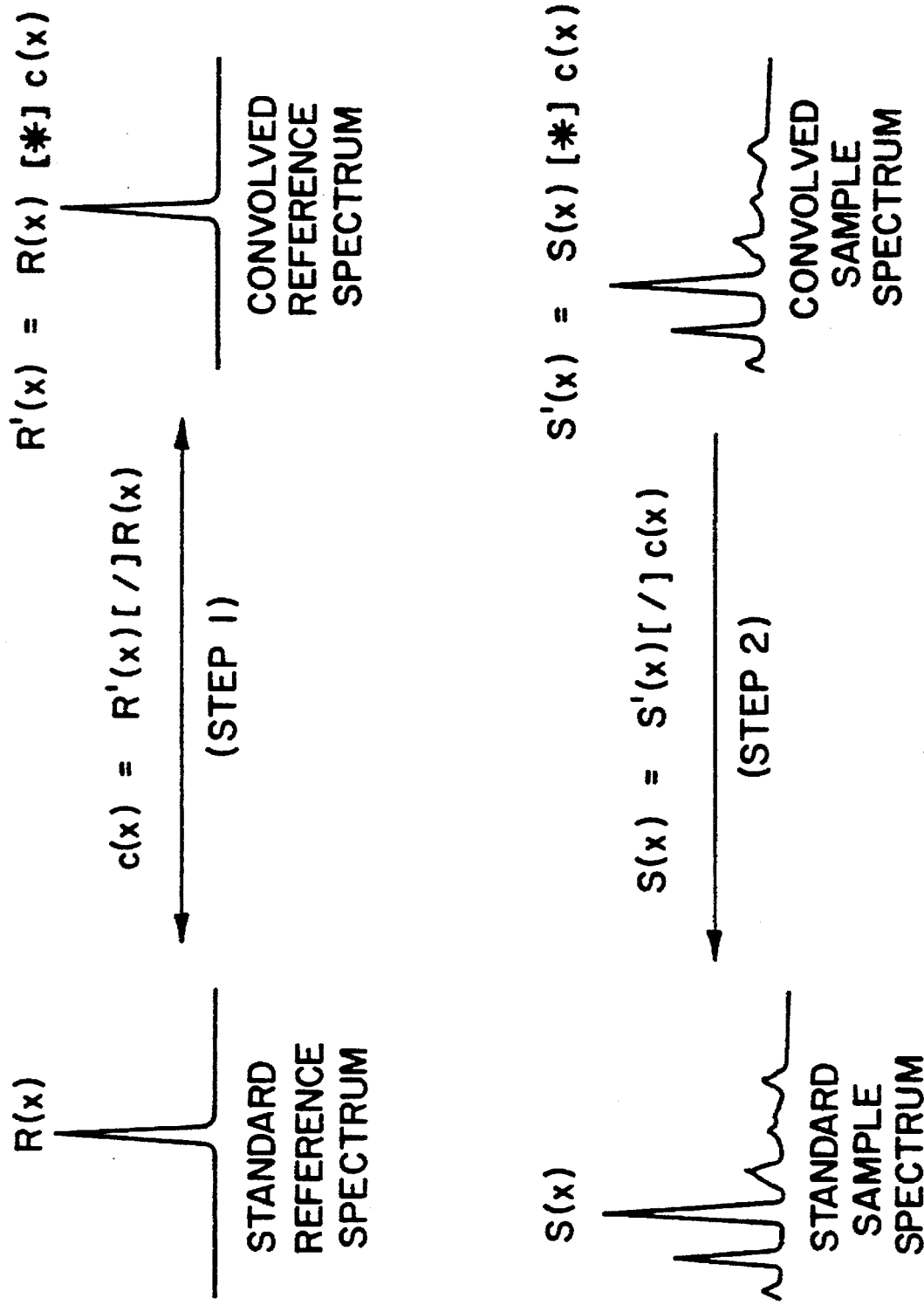
FIG. 4 is an illustration of the Fourier transform process of measuring differences between standard and convolved reference spectra for the purpose of standardizing the convolved sample spectrum.

FIG. 4 schematically illustrates the general process of measuring the spectral variations between the standard and convolved reference spectra and utilizing those measurements to adjust the convolved sample spectrum to obtain the standard sample spectrum. Carrying out this process by iterative computation is possible, although extremely arduous. Preferably, after the spectra $R'(x)$ and $S'(x)$ have been obtained, they can be transformed into the time domain using a FT method as described in, for example, W. H. Press et al., *Numerical Recipes: The Art of Scientific Computing*, 1986, Cambridge University Press, pp. 381–383 and 407–412, the disclosures of which are incorporated herein by reference. $R(x)$ is also transformed into the time domain and $c(x)$ is determined by dividing the FT of $R(x)$ into the FT of $R'(x)$. As the matrices for the FT of $R(x)$ and $R'(x)$ include complex numbers, this division must properly account for both the real and imaginary components. The symbols [/] and [*] used in FIG. 4 represent complex division and multiplication, respectively, in the FT time domain.

The calculated convolution function, $c(x)$, contains the necessary information to decode the variations and instabilities of the instrument occurring during the spectral acquisition. The FT of $S'(x)$ is then divided (again both matrices contain complex numbers) with $c(x)$ to result in the FT of $S(x)$. By calculating the inverse FT on this result, a standard sample spectrum, $S(x)$, which accurately represents the composition of the sample, is obtained.

If desired, $S(x)$ may be treated by procedures to achieve curve smoothing or to obtain the spectral derivatives, for example. These procedures may be useful when the spectra are used for reproducibly extracting quantitative compositional information. Curve smoothing methods are described in A. Savitsky and M. J. E. Golay, *Anal. Chem.*, 1964, vol. 36, pp. 1627–1639.

The method for obtaining the standard sample spectrum may be carried out with instruments of various forms. It is required, however, that the convolved reference spectrum derive from the same convolution function as the convolved sample spectrum. Two additional embodiments are described in FIGS. 5 and 6.

Figure 5:
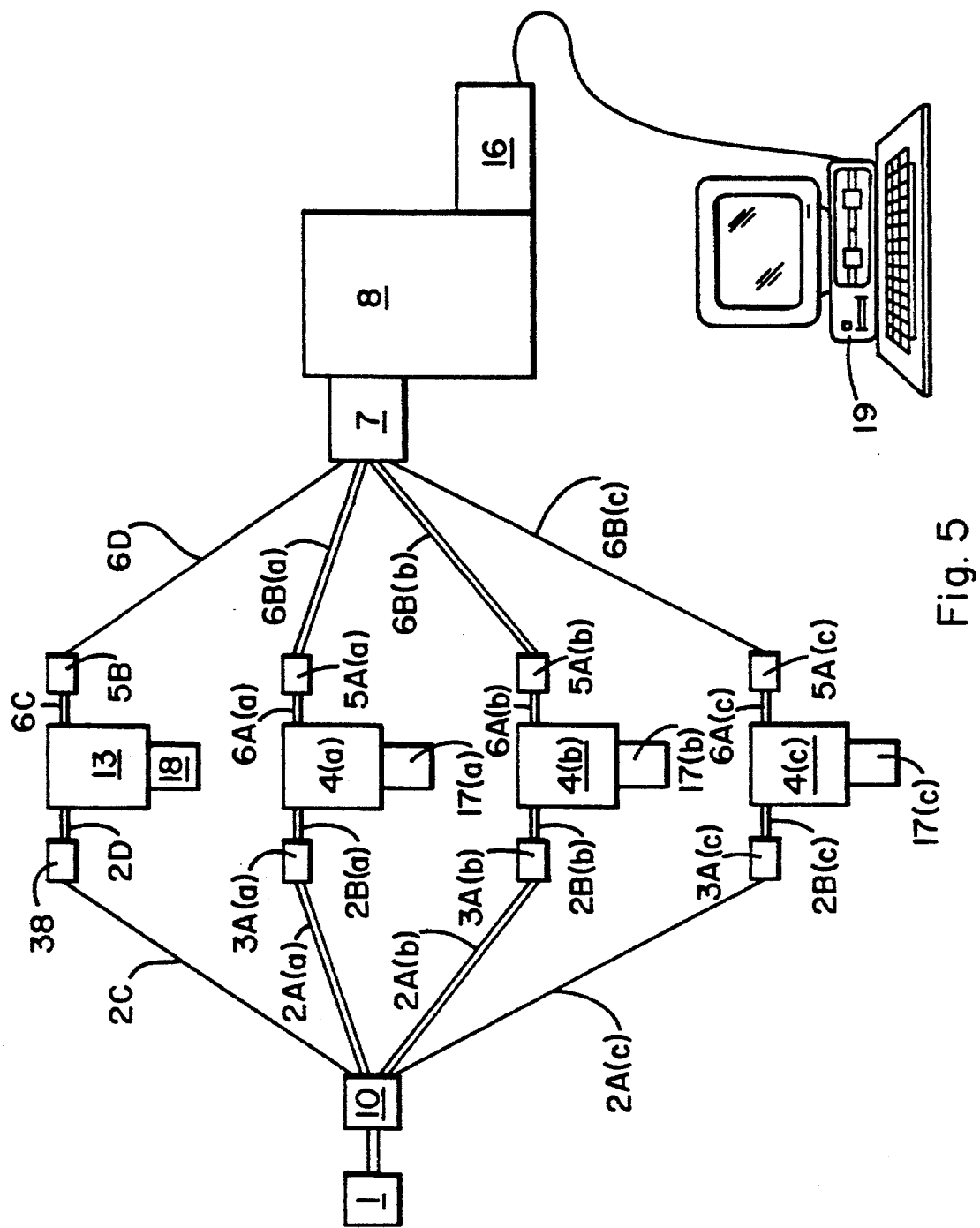
FIG. 5 is a schematic diagram of a multi-probe Raman spectrometer.

FIG. 5 shows the components of a Raman apparatus that is capable of simultaneously monitoring three materials. It consists of one radiation source with a four way beam splitter which directs radiation toward three separate samples and one reference material. The individual components are similar to those used in construction of the instrument shown in FIG. 2, where individual sample channels are denoted by (a), (b), and (c). The apparatus can be constructed with as many sample channels as desired, being limited by the acceptable radiation throughput of the radiation source and/or the physical dimensions of the two dimensional array detector. It has previously been shown by Angel et al. "Simultaneous Multi-point Fiber-Optic Raman Sampling for Chemical Process Control Using Diode Lasers and a CCD Detector" SPIE, 1991, Vol 1587, *Chemical, Biochemical, and Environmental Fiber Sensors III*, pp. 219–231, and Vess and Angel, "Near-Visible Raman Instrumentation for Remote Multi-Point Process Monitoring Using Optical Fibers and Optical Multiplexing," SPIE 1992, Vol 1637 *Environmental and Process Monitoring Technologies*, pp. 118–125, the disclosures of which are incorporated herein by reference, that a CCD detector is capable of simultaneously monitoring up to ten channels. The present invention is general and not limited by current physical dimensions of the detector; with correctly sized components, more than 100 samples may be monitored simultaneously on one Raman instrument.

Figure 6:
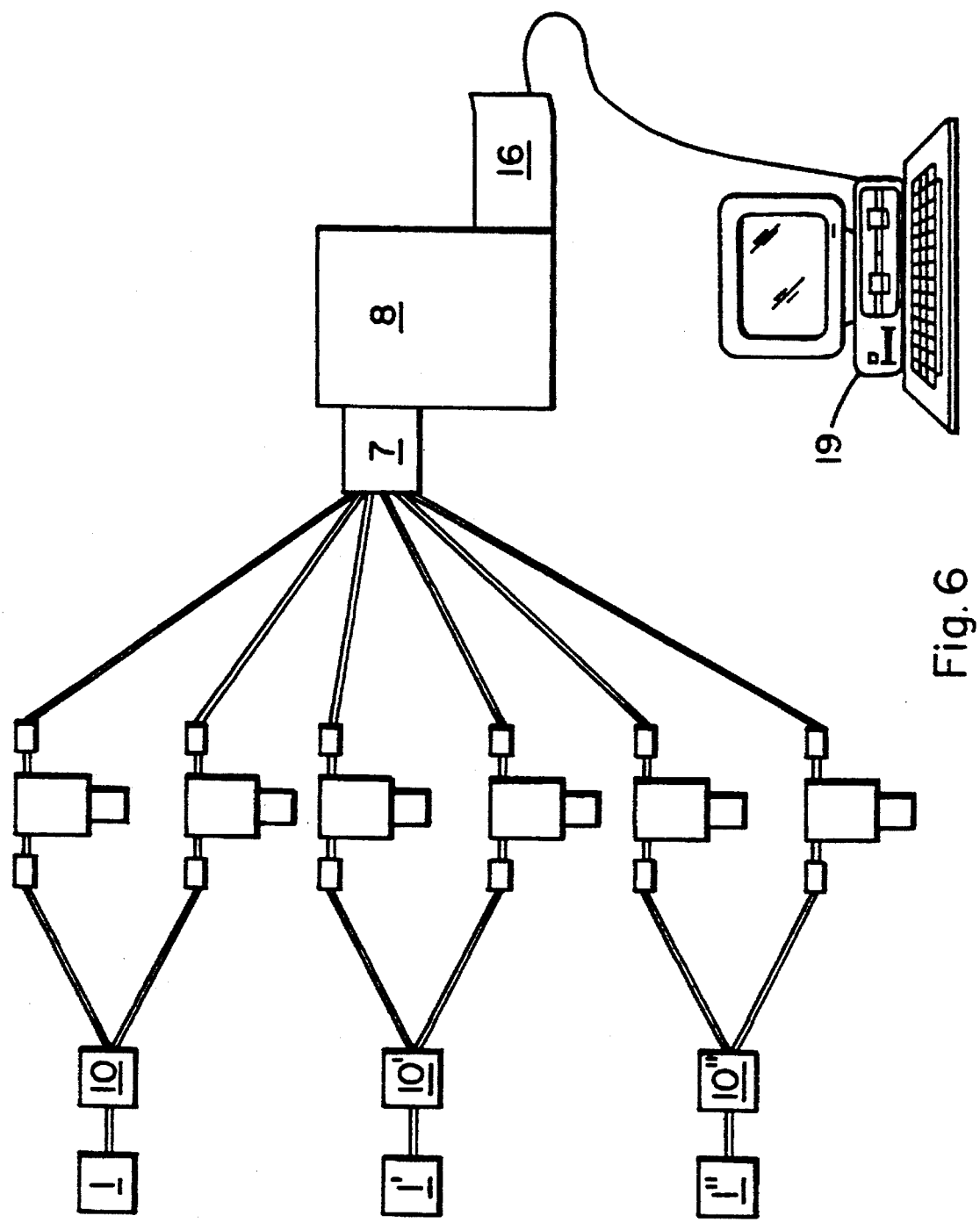
FIG. 6 is a schematic diagram of a multi-source Raman spectrometer.

FIG. 6 schematically illustrates another embodiment of the invention, in which multiple lasers, each with a reference and sample arm, are used. This embodiment is similar to that shown in FIG. 5, except that each sample channel has a corresponding reference channel to provide the necessary information for the standardization process.

Further embodiments maybe any combination of the above embodiments wherein multiple radiation sources are directed at multiple samples, each source having a respective reference sample. When multi-channel instruments are used, there may be differences in the instrument response between the channels. It is commonly known in the art that many differences in instrument response between channels may be determined and described by convolution functions derived by comparing the spectra of a common material acquired through the different channels. When multi-channel instruments are used in the practice of this invention, these channel-to-channel variations in instrument response may be corrected by applying the appropriate convolutions in addition to the standardization convolution of the invention.

By removing the uncertainties in laser stability, detector position, etc., the changes that occur between subsequent standardized spectra can be correlated to compositional changes in the sampled matter. Standardized spectra can be used to monitor compositional concentrations, reaction rates., or other important variables that relate to changes in the sample through time.

Another additional embodiment of the invention is the use of standardization of Raman spectra collected with a radiation source in a Raman system in which the detector is a Fourier transform spectrometer rather than an array detector. The Fourier transform spectrometer also collects the entire spectrum simultaneously. If the radiation characteristics change more slowly than the scan of the spectrometer, a spectral fragment from the spectrum may be used to standardize the spectrum. In the Fourier transform spectrometer, the spectrum commonly includes the excitation wavelength in the scan. Thus, the filters may be selected to leak enough light to act as the spectral fragment for the convolved reference spectrum.

Other multiplex detector arrangements as in, for example, a Hadamard spectrometer, may be used in the practice of the present invention. Hadamard transform spectroscopy, in which a dispersion spectrometer is employed in combination with a movable mask that contains a series of slits and is positioned in the focal plane, is described in J. A. Decker, Jr., *Applied Optics*, 1971, vol. 10, pp. 510–514, and D. A. Skoog and D. M. West, *Principles of Instrumental Analysis*, 2nd ed. 1980, Saunders College, Philadelphia, p. 254, the disclosures of which are incorporated herein by reference.

EXAMPLE 1

FT Raman spectra of toluene obtained with Nd:YAG laser in multi-mode operation

Raman spectra were collected on a Nicolet 60SX Fourier transform spectrometer equipped with a Nicolet FT Raman accessory. The Raman spectra were excited with a 5 watt CVI Nd:YAG laser operating in multi-mode configuration with about 1.25 watts at the sample, and were collected with 180 degree scattering geometry. Toluene (Burdick and Jackson High Purity Solvent) was placed in a quartz tube at the position that gives maximum signal. A spectrum consisted of 1000 scans co-added with a scan time of 2 seconds/scan. The resolution was 8 wavenumbers. The data were transferred to a personal computer, where the data processing was done.

Each spectral fragment was collected so that the elastically scattered radiation was also observed. As this spectral fragment is indicative of laser fluctuations, it was used for the convolved reference spectrum. The standard reference spectrum was chosen to be a delta function spike, which was later smoothed to a Gaussian shape in the Fourier domain. The convolution function was determined and each spectrum standardized using the described process. Spectrum to spectrum variation was significantly reduced.

Figure 7:
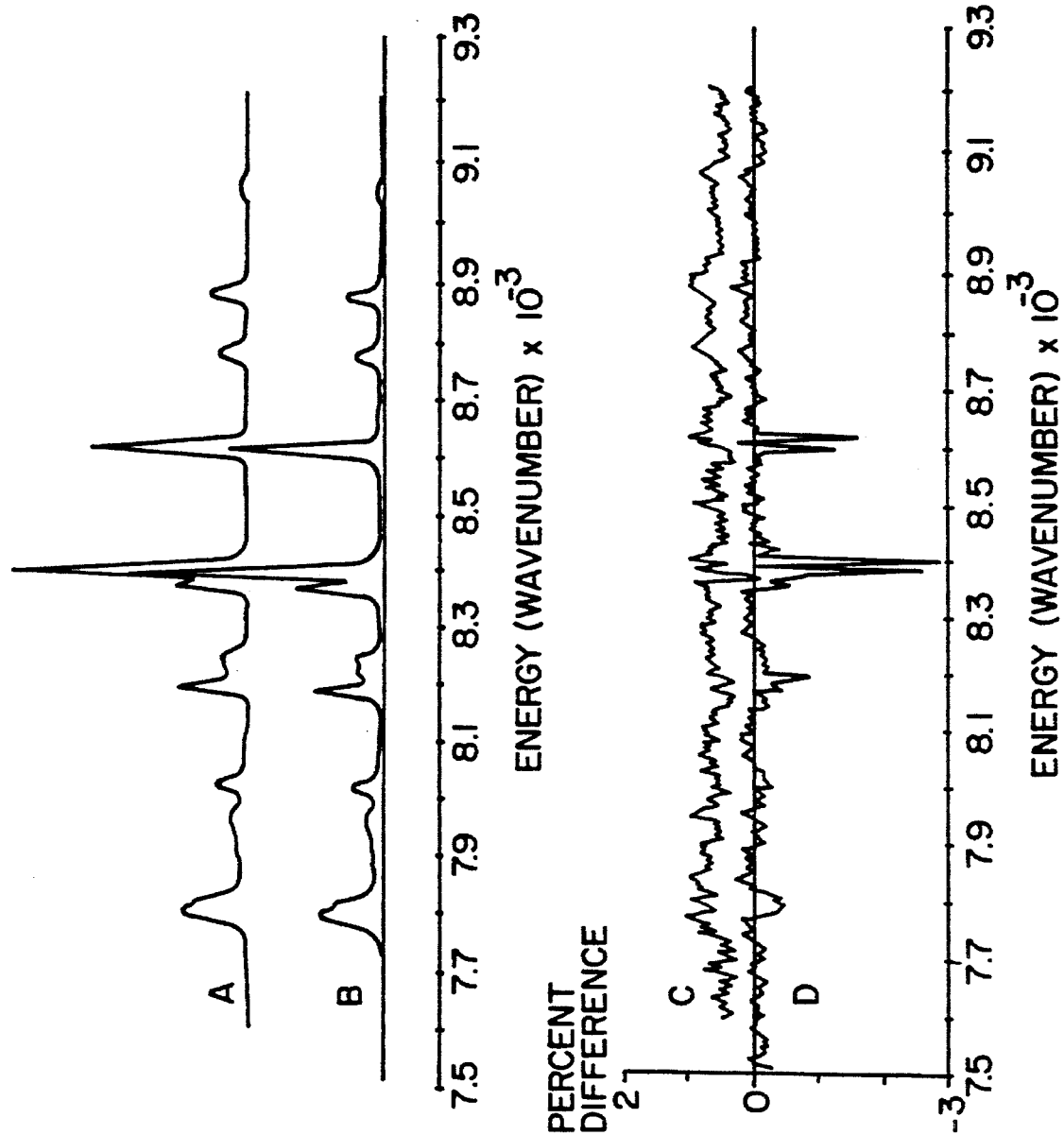
FIG. 7 is an illustration of the reduced variation in standardized spectra.

An example of the reduction in noise is shown in FIG. 7. Traces B and A are the Raman spectra of toluene shown as collected (convolved) and after the standardization process, respectively. Traces C and D show a difference spectrum from an average spectrum for the standardized spectra and as collected, respectively. (Traces A and C have been offset for the purpose of clarity). It is readily apparent from traces C and D that the standardized spectrum has a significant reduction in variation.

EXAMPLE 2

Sensitivity of Raman system to mechanical adjustments

A Raman spectrograph was assembled as in FIG. 1 to contain one optical probe. The radiation from a Lexel krypton ion gas laser operating at 752 nm was used to illuminate a toluene sample through the optical probe. A 0.3 meter single grating spectrograph from Instruments SA, Inc. (model number HR320) with a fiber optic spectrograph interface assembly and a liquid nitrogen cooled CCD detector (578× 416 pixels each 25 microns square) was used to collect, disperse, and monitor the Raman signal. A series of spectra was acquired while adjusting the position of the spectrograph grating and spectrograph interface slit width. These minor adjustments caused dramatic changes in the spectrum appearance by shifting band positions and broadening or narrowing bands.

The Raman vibrational bands between 950 $cm^{-1}$ and 1050 $cm^{-1}$ (249–314 pixels in FIG. 8) were used as the spectral fragment to determine the convolved reference spectrum. The initially collected convolved reference spectrum was used as the standard spectrum. Each subsequently acquired spectrum was standardized using the mathematical procedure described to determine a standard sample spectrum.

Figure 8:
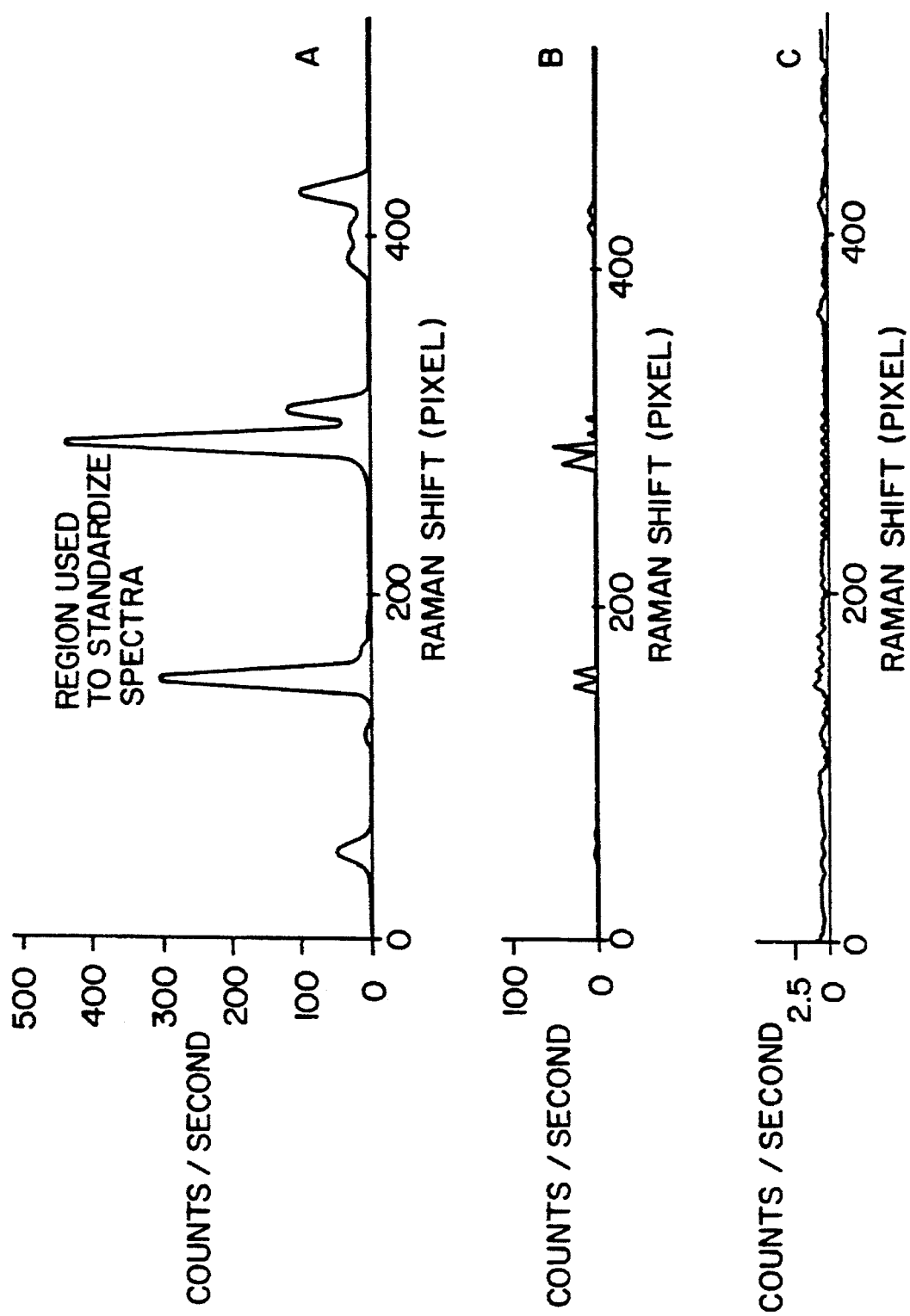
FIG. 8 is an illustration of the reduced variation in standardized spectra following variations in the apparatus.

FIG. 8 shows a spectrum of the toluene sample, trace A, the residual variation caused from the shifting of the spectrograph position, trace B, and the residual variation after the standardization process, trace C. (The scale of 0–500 pixels on the x-axis corresponds to the range of 540–1330 $cm^{-1}$.) Note that trace B indicates a typical variation pattern for an unstable instrument, with the greatest degree of variation occurring at inflection point regions. In trace C, this variation has been all but eliminated.

EXAMPLE 3

Raman spectrometric measurements of diamond using a multi-mode laser

The same spectrograph and detector from example 2 was used in conjunction with a 1.2 watt multi-mode gallium-aluminum-arsenide (GaAlAs) diode laser (Spectra Diode Labs) with a center wavelength of 800 nm. Such a laser exhibits a constantly changing wavelength and energy profile. The radiation was directed toward a diamond fragment, and the Raman scattered radiation was detected. A Raman spectrum of diamond exhibits one strong band located at 1332 cm$^{-1}$. A series of 200 sequential files was acquired and standardized to a theoretically shaped Gaussian curve.

An analysis of the experimental data showed that the raw spectra had a standard deviation as great as 3%. This degree of variation is excessive for precise quantitative work. The raw spectra were analyzed by using the 1332 cm$^{-1}$ spectral fragment in each diamond spectrum as the convolved reference spectrum. A mathematically derived three point half width Gaussian band was used as the standard reference spectrum. After the standardization process, analysis of the data indicated that the largest standard deviation across the entire data set of 200 sequential spectra was less than 0.2% deviation. The majority of this deviation was due to the fundamental shot noise limitations in the detection.

EXAMPLE 4

Dual beam spectrometric analysis of toluene with diamond reference material using a gas laser A Raman spectrograph was assembled with the same detector and spectrograph as in Example 3, with a two probe set-up similar to FIG. 2. The radiation from a Lexel krypton ion gas laser operating at 752 nm was split into each probe with a beam splitter (Oz Optics) and used to illuminate liquid toluene (sample) and a diamond fragment (reference material). A series of 200 sequential spectral pairs were collected and saved from both samples.

The 1332 cm$^{-1}$ band from each diamond spectrum was used as the convolved reference spectrum and a mathematically derived three point half width Gaussian band as the standard reference spectrum. A convolution function was determined for each spectral pair and used to standardize each toluene convolved sample spectrum. The variation in the resultant standard sample spectra was near that limited by shot noise.

Figure 9:
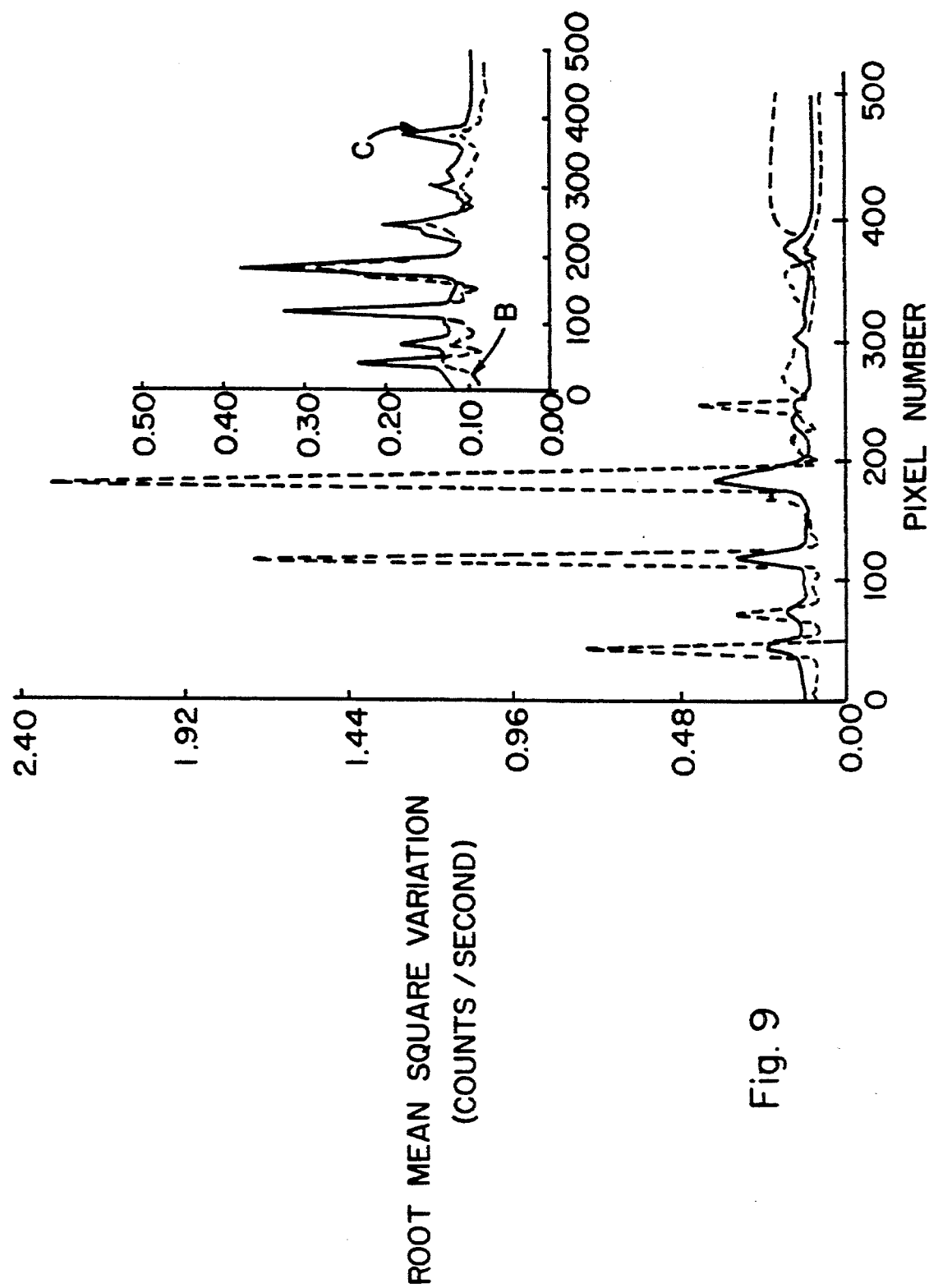
FIG. 9 is an illustration of reduced variation in standardized spectra from a gas laser in a dual beam spectrometer.

This reduction in variation is indicated in FIG. 9, which shows the root mean square (RMS) variation for the as collected (convolved) toluene spectra, trace a, the RMS variation for the standard toluene spectra, trace b, and an estimate of expected shot noise variation based on photon counting statistics, trace c. (The scale of 0–500 pixels on the x-axis corresponds to the range of 360–1940 cm$^{-1}$.) The small inset is an enlargement of traces b and c to show additional detail. It is clear that the standardization process is effective at removing a great portion of the random instrument instabilities which occur in the system.

EXAMPLE 5

Dual beam spectrometric analysis of toluene with diamond reference material using a diode laser A Raman spectrograph was assembled with the same detector and spectrograph as in Example 3, with a two probe set-up similar to FIG. 2. The radiation from a 1.2 Watt GaAlAs multi-mode diode laser (Spectra Diode Labs) operating at 800 nm was split into each probe with a beam splitter (Oz Optics) and used to illuminate liquid toluene (sample) and a diamond fragment (reference material). A series of 200 sequential spectral pairs were collected and saved from both samples.

The 1332 cm$^{-1}$ band from each diamond spectrum was used as the convolved reference spectrum and a mathematically derived three point half width Gaussian band as the standard reference spectrum. A convolution function was determined for each spectral pair and used to standardize each toluene convolved sample spectrum. The variation in the resultant standard sample spectra was near that limited by shot noise.

Figure 10:
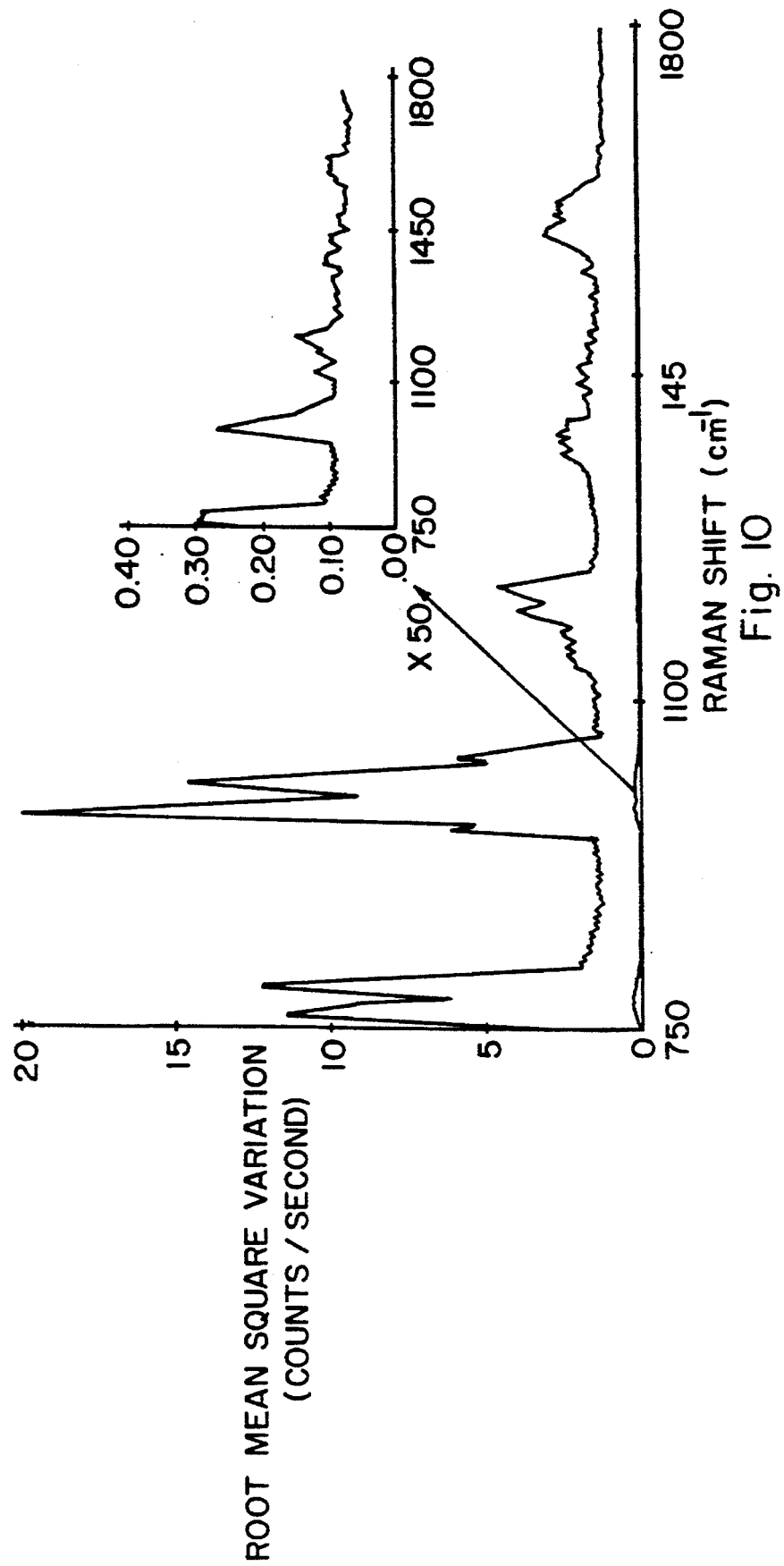
FIG. 10 is an illustration of reduced variation in standardized spectra from a multi-mode diode laser in a dual beam spectrometer.

The multi-mode laser is inherently unstable and exhibits a rapidly changing spectral profile. This is indicated by the RMS variation of the raw convolved spectra shown in FIG. 10. After the standardization process (lower curve and inset), the variation was significantly reduced, again being on the order of the expected shot noise variation. In this example, it would be impossible to use the raw convolved spectra for any sensitive quantitative analytical work; after standardization, however, virtually all instabilities have been eliminated, enabling quantitative determinations to be made.

The invention has been described in detail with particular reference to preferred embodiments thereof, but it will be understood that variations and modifications can be effected within the spirit and scope of the invention.

We claim:

1. A Raman spectrometry apparatus that is capable of measuring and compensating for variabilities in the apparatus, comprising: a source of substantially monochromatic radiation, means for simultaneously interfacing said radiation with a sample and a reference material, means for simultaneously acquiring at more than one wavelength a convolved Raman spectrum of said sample and a convolved spectrum of said reference material, means for determining the convolution function of said convolved spectra and applying said convolution function to adjust said convolved Raman spectrum of said sample to produce thereby the standard Raman spectrum of said sample.

2. A Raman spectrometry apparatus according to claim 1 wherein said source of radiation is a laser.

3. A Raman spectrometry apparatus according to claim 2 wherein said laser is a diode laser.

4. A Raman spectrometry apparatus according to claim 3 wherein said diode laser is a multi-mode diode laser.

5. A Raman spectrometry apparatus according to claim 1 wherein the convolved Raman spectrum of said sample includes the convolved Raman spectrum of said reference material.

6. A Raman spectrometry apparatus according to claim 1 wherein said means for simultaneously interfacing said radiation with a sample and a reference material comprises an optical probe.

7. A Raman spectrometry apparatus according to claim 6 wherein said optical probe comprises at least one optical fiber.

8. A Raman spectrometry apparatus according to claim 7 wherein said optical probe further comprises a window or cell comprising said reference material.

9. A Raman spectrometry apparatus according to claim 1 wherein said means for simultaneously acquiring at more than one wavelength the convolved Raman spectrum of said sample and the convolved spectrum of said reference material comprises a spectrograph in combination with a multi-channel array detector.

10. A Raman spectrometry apparatus according to claim 9 wherein said multi-channel array detector is a photo-diode array, a charge-coupled device, a photographic film, a Vidicon tube, or a charge injection device.

11. A Raman spectrometry apparatus according to claim 10 wherein said multi-channel array detector is a charge-coupled device.

12. A Raman spectrometry apparatus according to claim 1 wherein said means for simultaneously acquiring at more than one wavelength the convolved Raman spectrum of said sample and the convolved spectrum of said reference material comprises an interferometer or a dispersion spectrometer.

13. A Raman spectrometry apparatus according to claim 1 wherein said means for determining the convolution function of said convolved Raman spectra and applying said convolution function to said convolved Raman spectrum of said sample to produce the standard Raman spectrum of said sample comprises a Fourier transform algorithm.

14. A Raman spectrometry apparatus according to claim 13 wherein said means comprises a Fourier transform algorithm applied to the convolved Raman spectrum of said sample, the convolved spectrum of said reference material, and the standard spectrum of said reference material.

15. A Raman spectrometry apparatus according to claim 1 that further comprises means for splitting radiation into at least two beams.

16. A Raman spectrometry apparatus according to claim 15 wherein said means for splitting radiation into at least two beams comprises a fused fiber optic beam splitter, a prism, or a half-silvered mirror.

17. A Raman spectrometry apparatus according to claim 16 wherein said means comprises a fused fiber optic beam splitter.

18. A method for obtaining the standard Raman spectrum of a sample that comprises:

(a) simultaneously irradiating said sample and a reference material with a substantially monochromatic radiation source;

(b) simultaneously acquiring at more than one wavelength a convolved Raman spectrum of said sample and a convolved spectrum of said reference material;

(c) choosing the standard spectrum of said reference material;

(d) from the convolved Raman spectrum of said sample and the convolved Raman spectrum of said reference material and the standard spectrum of said reference material, determining the convolution function of said convolved spectra; and (e) applying said convolution function to adjust the convolved Raman spectrum of said sample to produce thereby the standard Raman spectrum of said sample.

19. A method according to claim 18 wherein said radiation source is a laser.

20. A method according to claim 19 wherein said laser is a diode laser.

21. A method according to claim 20 wherein said diode laser is a multi-mode diode laser.

22. A method according to claim 18 wherein the convolved Raman spectrum of the sample includes the convolved Raman spectrum of the reference material.

23. A method according to claim 22 wherein the convolved Raman spectrum of the reference material comprises the convolved Raman spectrum of the sample solvent.

24. A method according to claim 18 wherein the convolved spectrum of the reference material comprises elastically scattered radiation.

25. A method according to claim 18 wherein said reference material comprises diamond.

26. A method according to claim 18 wherein the simultaneous acquiring at more than one wavelength of a convolved Raman spectrum of said sample and a convolved spectrum of said reference material is carried out using a first spectrograph in combination with a multi-channel array detector.

27. A method according to claim 26 wherein said multi-channel array detector comprises a charge-coupled device.

28. A method according to claim 18 wherein the choosing of the standard spectrum of said reference material is carried out by the averaging of a multiplicity of previously acquired convolved spectra of said reference material.

29. A method according to claim 18 wherein the choosing of the standard spectrum of said reference material is carried out by the adjusting of a previously acquired spectrum of said reference material.

30. A method according to claim 18 wherein the determining of said convolution function is carried out by a Fourier transform algorithm.

31. A method according to claim 26 wherein the standard spectrum of said reference material is acquired using a second spectrograph.

32. A Raman spectrometry apparatus that is capable of measuring and compensating for variabilities in the apparatus, comprising: a source of substantially monochromatic radiation, an optical waveguide, a radiation filter, an optical probe, a spectrograph, a detector that simultaneously monitors at more than one wavelength the convolved Raman spectrum of a sample and the convolved spectrum of a reference material, and a computer provided with mathematical routines to determine, from said convolved spectra together with a selected standard spectrum of said reference material, the convolution function of said convolved spectra, said convolution function thereafter being applied to adjust the convolved Raman spectrum of said sample to produce thereby the standard Raman spectrum of said sample.

33. A Raman spectrometry apparatus according to claim 32 that further comprises a beam splitter.

34. A Raman spectrometry apparatus according to claim 32 wherein said source of radiation is a laser.

35. A Raman spectrometry apparatus according to claim 34 wherein said laser is a multi-mode diode laser.

36. A Raman spectrometry apparatus according to claim 32 wherein said optical probe comprises at least one optical fiber.

37. A Raman spectrometry apparatus according to claim 33 wherein said beam splitter comprises a fused fiber optic beam splitter.

38. A Raman spectrometry apparatus according to claim 32 wherein said spectrograph is a dispersion spectrograph or a FT-interferometer.

39. A Raman spectrometry apparatus according to claim 32 wherein said detector is a multi-channel array detector.

40. A Raman spectrometry apparatus according to claim 39 wherein said multi-channel array detector is a charge-coupled device.

* * * * *